US012625781B1

(12) United States Patent (10) Patent No.: US 12,625,781 B1
Burke et al. (45) Date of Patent: May 12, 2026

(54) FAULT ISOLATION IN AN I/O FABRIC USING DOWNSTREAM PORT CONTAINMENT

(71) Applicant: International Business Machines Corporation, Armonk, NY (US)

(72) Inventors: Seamus J. Burke, Tucson, AZ (US); Louis A. Rasor, Tucson, AZ (US); Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/948,261

(22) Filed: Nov. 14, 2024

(51) Int. Cl.
| | |
|---|---|
| *G06F 11/16* | (2006.01) |
| *G06F 11/07* | (2006.01) |
| *G06F 11/14* | (2026.01) |

(52) U.S. Cl.
CPC ...... *G06F 11/1658* (2013.01); *G06F 11/0772* (2013.01); *G06F 11/1441* (2013.01)

(58) Field of Classification Search
CPC ............. G06F 11/1658; G06F 11/0772; G06F 11/1441
See application file for complete search history.

(56) References Cited

U.S. PATENT DOCUMENTS

| | | | |
|---|---|---|---|
| 8,843,688 B2 | 9/2014 | Engebretsen et al. | |
| 9,086,945 B2 | 7/2015 | Bolen et al. | |
| 9,195,552 B2 | 11/2015 | Shao et al. | |
| 9,678,826 B2 | 6/2017 | Lin et al. | |

| | | | |
|---|---|---|---|
| 10,162,780 B2 | 12/2018 | Choi | |
| 11,153,032 B2 | 10/2021 | Das Sharma | |
| 11,954,058 B2 | 4/2024 | Shao | |
| 2016/0132395 A1* | 5/2016 | Bolen ................. | G06F 11/0745 |
| | | | 714/5.11 |
| 2018/0225167 A1* | 8/2018 | Jayaprakash Bharadwaj ............. | |
| | | | G06F 11/0736 |
| 2020/0050523 A1* | 2/2020 | Pawlowski ......... | G06F 13/4022 |
| 2023/0161728 A1 | 5/2023 | Liu | |
| 2023/0251990 A1 | 8/2023 | Sodke et al. | |
| 2024/0053718 A1* | 2/2024 | Jasper ................ | G05B 19/0428 |

(Continued)

OTHER PUBLICATIONS

Darvishi, et al., Fault-Resilient PCIe Bus with Real-time Error Detection and Correction, IEEE International Symposium on Defect and Fault Tolerance in VLSI and Nanotechnology Systems, May 12, 2021, 7 pages.

(Continued)

*Primary Examiner* — Jigar P Patel
(74) *Attorney, Agent, or Firm* — CANTOR COLBURN LLP; Edward Wixted

(57) ABSTRACT

A technique of non-disruptive fault isolation for an input/output (I/O) subsystem includes processing circuitry at a root complex interposed between a plurality of server platforms and a plurality of I/O switches receiving, via an I/O switch among the plurality of I/O switches, notification of downstream port containment of an I/O port to which an I/O adapter is coupled. In response to receipt of the notification, the processing circuitry notifies the plurality of attached server platforms of the downstream port containment to cause the plurality of server platforms to refrain from attempting communication of I/O traffic via the I/O adapter. The processing circuitry waits a containment interval, and thereafter, releases the containment to permit resetting of the I/O adapter.

19 Claims, 3 Drawing Sheets

(56) References Cited

U.S. PATENT DOCUMENTS

| | | |
|---|---|---|
| 2024/0103961 A1 | 3/2024 | Wang |
| 2024/0152417 A1 | 5/2024 | Gong et al. |
| 2024/0176739 A1* | 5/2024 | Alden ................. G06F 11/1658 |
| 2024/0231996 A1 | 7/2024 | Monserrat et al. |
| 2024/0354186 A1* | 10/2024 | Nguyen .............. G06F 11/0745 |

OTHER PUBLICATIONS

Enhanced Downstream Port Containment Enablement for Hot-Plug, White Paper, May 2022, 10 pages.

Miroshnichenko, S., "PCI Hotplug: Movable Bars and Bus Numbers", Linux Plumbers Conference, Linux Plumbers Conference 2020—VFIO/IOMMU/PCI MC, Aug. 24-28, 2020, 23 pages.

Nguyen, et al., "PCI Express Port Bus Driver Support for Linux", Intel Corporation, Jul. 20-23, 2005, vol. 2, 12 pages.

Shim, et al., Compatibility Enhancement and Performance Measurement for Socket Interface With PCIe Interconnections, Human-centric Computing and Information Science, Mar. 12, 2019, 18 pages.

* cited by examiner

FAULT ISOLATION IN AN I/O FABRIC USING DOWNSTREAM PORT CONTAINMENT

STATEMENT REGARDING PRIOR DISCLOSURES BY THE INVENTOR OR A JOINT INVENTOR

The inventors hereof are aware of the following prior public disclosure:

"Accelerating Innovation in Mainframe Storage for Next-Generation Workloads with the new IBM DS8000," Sep. 10, 2024, published online at https://newsroom.ibm.com/blog-accelerating-innovation-in-mainframe-storage-for-next-generation-workloads-with-the-new-ibm-ds8000

BACKGROUND OF THE INVENTION

The present invention relates in general to data processing, and more specifically, to fault isolation in an input/output (I/O) fabric using downstream port containment.

Large scale cloud-based data centers typically include significant input/output resources, often implemented utilizing hot-pluggable field replaceable units (FRUs) that support efficient maintenance and replacement of I/O devices, such as network adapters and storage controllers. By employing hot-pluggable FRUs, maintenance and replacement of failing FRUs can be accomplished without server downtime.

Recently, I/O protocols have been enhanced to provide additional error isolation capabilities. For example, some I/O protocols, such as Peripheral Component Interconnect Express (PCIe) version 4, now support Downstream Port Containment (DPC), which enables I/O traffic at or below a downstream port to be halted in response to detection of an unmasked uncorrectable error. As discussed further herein, the capability of DPC can be leveraged to provide enhanced fault isolation and to prevent spread of I/O errors and data corruption.

SUMMARY OF THE INVENTION

In accordance with one or more embodiments, a method, system, and/or computer program product can be utilized to implement a technique of non-disruptive fault isolation for an input/output (I/O) subsystem. According to the technique, processing circuitry at a root complex interposed between a plurality of server platforms and a plurality of I/O switches receives, via an I/O switch among the plurality of I/O switches, notification of downstream port containment of an I/O port to which an I/O adapter is coupled. In response to receipt of the notification, the processing circuitry notifies the plurality of attached server platforms of the downstream port containment to cause the plurality of server platforms to refrain from attempting communication of I/O traffic via the I/O adapter. The processing circuitry waits a containment interval, and thereafter, releases the containment to permit resetting of the I/O adapter.

Figure 1:
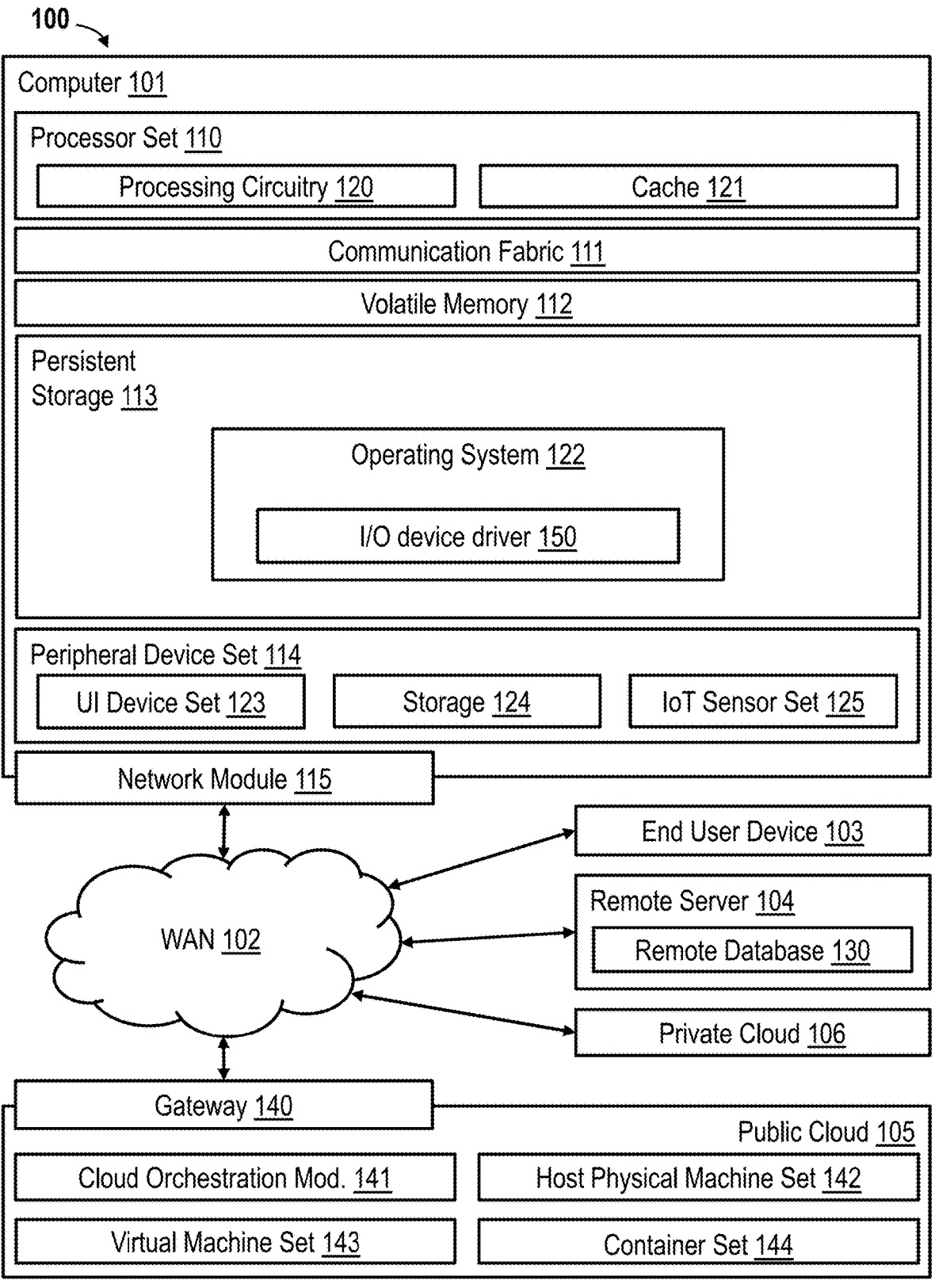
FIG. 1 is a high-level block diagram of an exemplary data processing environment in accordance with one or more embodiments.

In accordance with common practice, various features illustrated in the drawings may not be drawn to scale. Accordingly, dimensions of the various features may be arbitrarily expanded or reduced for clarity. In addition, some of the drawings may not depict all of the components of a given system, method, or device. Finally, like reference numerals may be used to denote like or corresponding features in the specification and figures.

DETAILED DESCRIPTION OF ILLUSTRATIVE EMBODIMENT

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 1, computing environment 100 contains an example of an environment for the execution of at least some of the computer code involved in performing the inventive methods. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and other code and data), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be implemented in I/O device driver 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Operating system 122 includes an I/O device driver 150 for managing I/O communication of computer 101. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet-of-Things applications.

For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network, including the Internet, capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from WAN 102 entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Those of ordinary skill in the art will appreciate that the architecture and components of a data processing environment can vary between embodiments. Accordingly, the exemplary computing environment 100 given in FIG. 1 is not meant to imply architectural limitations with respect to the claimed invention.

Figure 2:
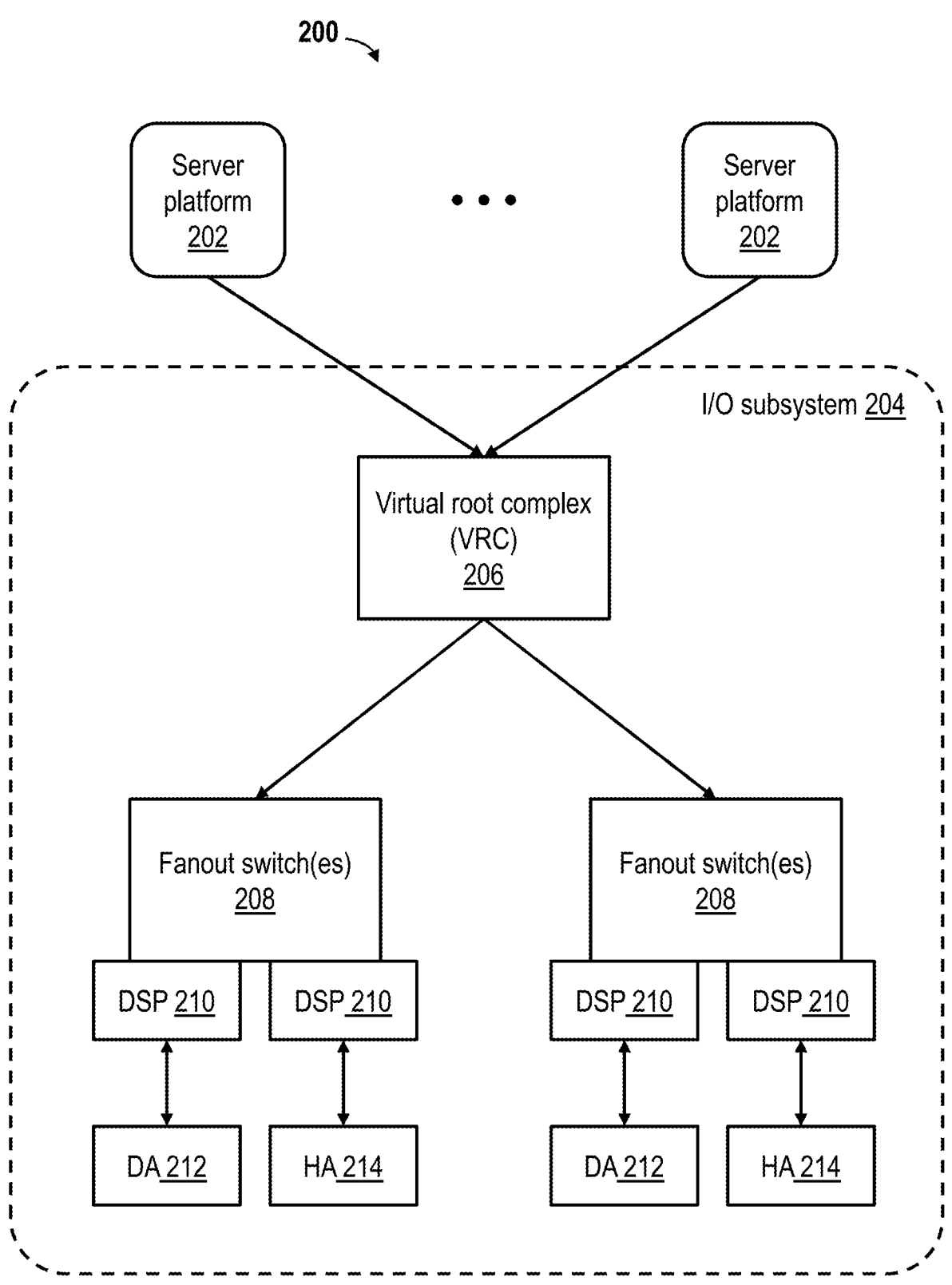
FIG. 2 is a high-level block diagram of an exemplary data center embodiment of the computing environment of FIG. 1.

Referring now to FIG. 2, there is depicted a high-level block diagram of an exemplary data center embodiment 200 of computing environment 100 generally illustrated in FIG. 1. In this embodiment, data center 200 includes one or more server platforms 202, each of which can be implemented, for example, with a computer 101. One of server platforms 202 can be designated, for example, by the setting of a configuration register or a quorum vote among server platforms 202, as a controlling server platform 202 that manages a shared I/O subsystem 204 on behalf of server platform(s) 202.

I/O subsystem 204 includes a virtual root complex (VRC) 206 to which one or more fanout switches 208 are communicatively coupled. As is known in the art, VRC 206 implements a switch that serves as the intermediary between the processing resources provided by server platforms 202 and the I/O switch fabric of I/O subsystem 204. VRC 206 detects, polls, configures, recovers, resets, and disables I/O devices as required during operation of I/O subsystem 204. In some embodiments, VRC 206 can be implemented on a computing platform like computer 101 (e.g., as a virtual switch). In some embodiments, VRC 206 can be implemented on one of server platforms 202, for example, as part of operating system 122. In other embodiments, VRC 206 can be implemented on a special-purpose hardware platform including its own processing circuitry 120.

Each of fanout switches 208 includes multiple I/O ports, each managed by a digital signal processor (DSP) 210. The I/O ports can be further coupled by an I/O link to a device adapter (DA) 212 that interfaces an I/O device, such as a storage adapter or network adapter, or to a host adapter (HA) 214 that interfaces another host system (e.g., remove server platform 104) to the I/O subsystem 204. In accordance with preferred embodiments, DSPs 210 support downstream port containment, enabling a DSP 210 that detects an uncorrectable error on a port to automatically disable the link below that port to prevent the spread of corrupted data and to allow the associated adapter and/or I/O device to be reset or replaced.

Figures 3, 4:
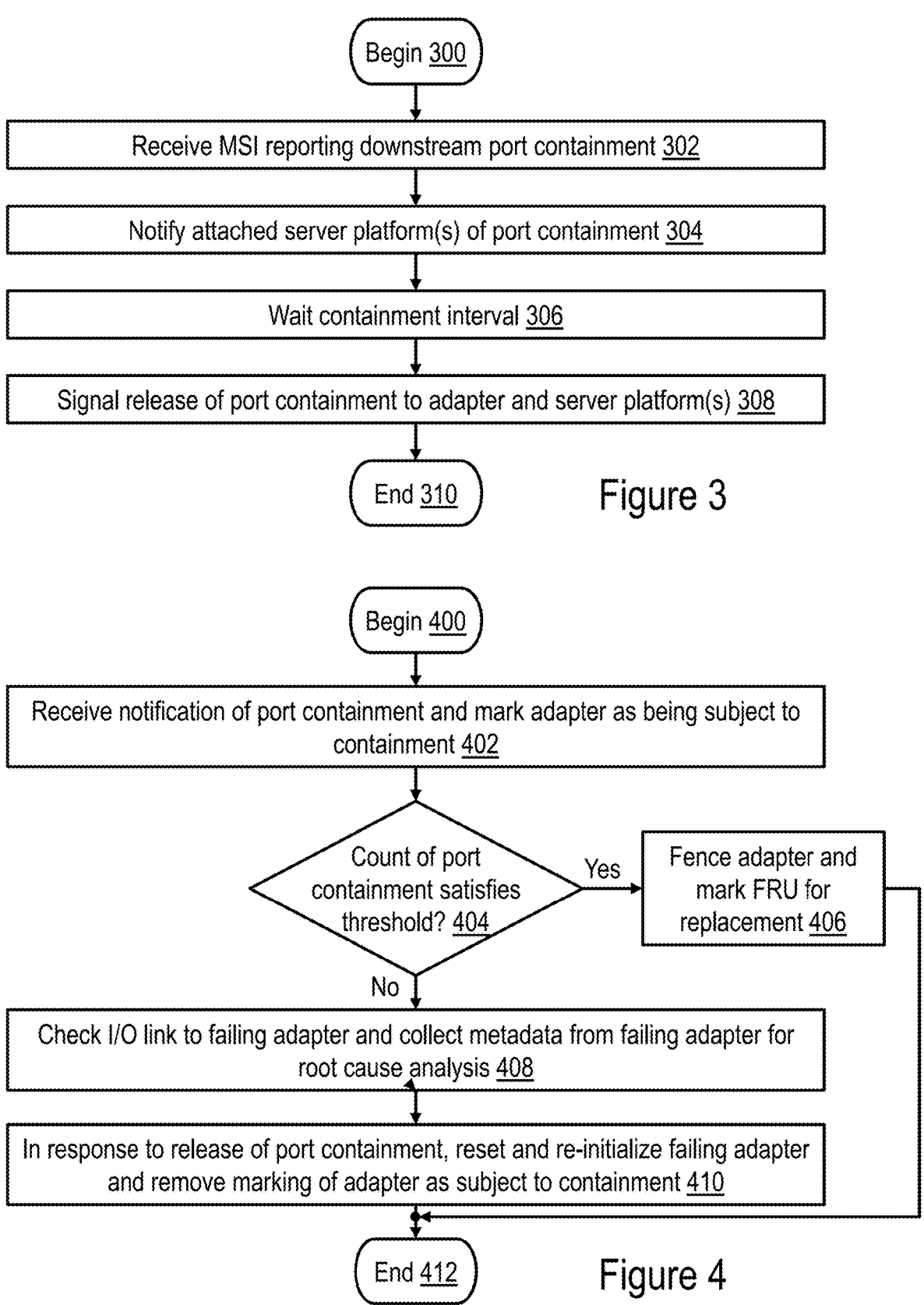
FIG. 3 is a high-level logical flowchart of an exemplary process by which a root complex of an I/O subsystem implements fault containment using downstream port containment in accordance with one or more embodiments.
FIG. 4 is a high-level logical flowchart of an exemplary process by which a controller server implements fault containment using downstream port containment in accordance with one or more embodiments.

With reference now to FIG. 3, there is illustrated a high-level logical flowchart of an exemplary process by which a root complex of an I/O subsystem implements fault containment using downstream port containment in accordance with one or more embodiments. The illustrated process can be performed, for example, by VRC 206 of FIG. 2.

The process of FIG. 3 begins at block 300, for example, in response to a device adapter 212 or host adapter 214 encountering an uncorrectable error and signaling the uncorrectable error (e.g., ERR_FATAL) to the associated DSP 210 of the attached downstream port. In response to the uncorrectable error, the DSP 210 will enforce port containment on the I/O link on which the error was signaled and report the port containment to VRC 206, for example, in a message-signaled interrupt (MSI).

The process then proceeds from block 300 to block 302, which illustrates VRC 206 receiving, from a fanout switch 208, the MSI reporting the downstream port containment. In response to receipt of the MSI, VRC 206 notifies the attached server platforms 202, including the controlling server platform 202, of the downstream port containment (block 304). In at least one embodiment, VRC 206 provides the notification via a MSI broadcast to all server platforms 202. VRC 206 then waits for the elapse of a time interval, referred to herein as the "containment interval," triggered by receipt of the MSI reporting the downstream port containment or by notification of the server platforms 202 (block 306). As discussed below with reference to FIG. 4, the containment interval provides time for the controlling server platform 202 responsible for management of I/O subsystem 204 to take appropriate remedial action in response to the downstream port containment. In various embodiments, the containment interval 306 can be a time interval of predetermined duration or can terminate in response to another event, such as a message from the controller server platform 202.

In response to elapsing of the containment interval, VRC 206 signals release of the downstream port containment to server platform(s) 202 and to the relevant adapter 212 or 214 applying the downstream port containment (block 308). In response to receipt of the signal, the adapter 212 or 214 releases the downstream port containment so that the adapter 212 or 214 can re-establish I/O communication with its fanout switch 208 and VRC 206 via its I/O link (block 308). Thereafter, the process of FIG. 3 ends at block 310.

Referring now to FIG. 4, there is depicted a high-level logical flowchart of an exemplary process by which a controller server implements fault containment using downstream port containment in accordance with one or more embodiments. The depicted process can be performed, for example, through execution of an I/O device driver 150 by processing circuitry 120 of a controlling server platform 202 of data center 200 of FIG. 2.

The process of FIG. 4 begins at block 400 and then proceeds to block 402, which illustrates the controlling server platform 202 receiving notification from VRC 206 of the downstream port containment and making the affected adapter 212 or 214 as subject to port containment. Each server platform 202 marking the affected adapter 212 or 214 as subject to downstream port containment causes server platforms 202 to refrain from attempting to communicate with the affected adapter 212 or 214, reducing or eliminating potentially cascading errors, such as completion timeouts that would occur if a server platform 202 attempted to read the affected adapter 212 or 214.

At block 404, the controlling server platform 202 determines whether or not a number of times that the affected adapter 212 or 214 has entered downstream port containment satisfies (e.g., is greater than) a containment threshold. In various implementations, the containment threshold can be a positive integer that is 1 or greater and that can be predetermined or dynamically determined based on heuristics. In response to the controller server platform 202 determining at block 404 that the port containment count for the affected adapter 212 or 214 is greater than the containment threshold, the controlling server platform 202 fences the affected adapter 212 or 214 to prevent further access to the affected adapter 212 or 214 by any of server platforms 202 and marks the field-replaceable unit (FRU) containing the affected adapter 212 or 214 for physical replacement, for example, by updating a configuration database for I/O subsystem 204, updating an administrative console or dashboard for I/O subsystem 204, issuing a textual notification to maintenance personnel, etc. (block 406). Thereafter, the process of FIG. 4 ends at block 412.

In response to the controller server platform 202 determining at block 404 that the port containment count for the affected adapter 212 or 214 is less than or equal to the containment threshold, the controlling server platform 202 checks the I/O link and collects any metadata regarding adapter operation from the affected adapter 212 or 214 for root cause analysis (block 408). In response to VRC 206 signaling release of port containment, the controlling server platform 202 additionally resets and re-initializes the affected adapter 212 or 214 and removes the marking of the affected adapter 212 or 214 as being subject to downstream port containment (block 410). Thereafter, server platforms 202 can again communicate I/O traffic with the adapter 212 or 214, and the process of FIG. 4 ends at block 412.

As has been described, according to one or more embodiments, a method, system, and/or computer program product can be utilized to implement a technique of non-disruptive fault isolation for an input/output (I/O) subsystem. According to the technique, processing circuitry at a root complex interposed between a plurality of server platforms and a plurality of I/O switches receives, via an I/O switch among the plurality of I/O switches, notification of downstream port containment of an I/O port to which an I/O adapter is coupled. In response to receipt of the notification, the processing circuitry notifies the plurality of attached server platforms of the downstream port containment to cause the plurality of server platforms to refrain from attempting communication of I/O traffic via the I/O adapter. The processing circuitry waits a containment interval, and thereafter, releases the containment to permit resetting of the I/O adapter.

While the present invention has been particularly shown as described with reference to one or more preferred embodiments, it will be understood by those skilled in the art that various changes in form and detail may be made therein without departing from the spirit and scope of the invention.

The following definitions are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, system or apparatus that comprises a list of elements is not necessarily limited to only those elements but can include other elements not expressly listed or inherent to such composition, mixture, process, method, article, system or apparatus.

Additionally, the term "exemplary" is used herein to mean "serving as one example, instance or illustration." Any embodiment or design described herein as "exemplary" is not necessarily to be construed as preferred or advantageous over other embodiments or designs. The terms "at least one" and "one or more" shall be understood to include any integer number greater than or equal to one, and the term "plurality" shall be understood to include any integer number greater than or equal to two. The term "coupled" shall include both indirect connection and a direct connection, unless specified otherwise in a particular case. The terms "about," "substantially," "approximately," and variations thereof, are intended to include the degree of error associated with measurement of the particular quantity based upon the equipment available at the time of filing the application. For example, "about" can include a range of ±10%, or ±5%, or ±2% of a given value.

The figures described herein and the written description of specific structures and functions are not presented to limit the scope of what applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. For the sake of brevity, conventional techniques related to making and using aspects of the invention(s) may or may not be described in detail herein, and many conventional implementation details are only mentioned briefly or are omitted entirely. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A computer-implemented method of non-disruptive fault isolation for an input/output (I/O) subsystem, the method comprising:

at a root complex interposed between a plurality of server platforms and a plurality of I/O switches, processing circuitry receiving, via an I/O switch among the plurality of I/O switches, notification of downstream port containment of an I/O port to which an I/O adapter is coupled;

in response to receipt of the notification, the processing circuitry notifying the plurality of server platforms of the downstream port containment to cause the plurality of server platforms to refrain from attempting communication of I/O traffic via the I/O adapter;

during an containment interval, a controlling server platform among the plurality of server platforms checking an I/O communication link coupling the I/O adapter and the I/O switch and collecting metadata regarding adapter operation from the I/O adapter for root-cause analysis while the I/O adapter is being subject to downstream port containment and the processing circuitry waiting a containment interval, and thereafter, releasing the containment to permit resetting of the I/O adapter, wherein the I/O adapter is a storage adapter; providing the notification to the plurality of server platforms comprises an MSI broadcast to all of the plurality of server platforms; and the containment interval terminates in response to a message from the controlling server platform.

2. The method of claim 1, further comprising:

the controlling server platform resetting the I/O adapter after elapsing of the containment interval.

3. The method of claim 1, further comprising:

a controlling server platform among the plurality of server platforms determining whether a port containment count for the I/O adapter satisfies a containment threshold; and based on determining that the port containment count satisfies the containment threshold, the controlling server platform fencing the I/O adapter from receiving further I/O traffic and marking for physical replacement a field-replaceable unit including the I/O adapter.

4. The method of claim 3, wherein:

receiving notification of downstream port containment includes receiving a message signaled interrupt.

5. The method of claim 3, wherein:

releasing containment includes the processing circuitry signaling release of containment to both the I/O adapter and the plurality of server platforms.

6. The method of claim 3, wherein providing the notification to the plurality of server platforms includes broadcasting a message signaled interrupt to all of the plurality of server platforms.

7. The method of claim 3, wherein the containment interval terminates in response to a message from a controlling server platform among the plurality of server platforms.

8. The method of claim 3, wherein, in response to the notification, each of the plurality of server platforms marks the I/O adapter as subject to downstream port containment to refrain from attempting communication with the I/O adapter.

9. The method of claim 3, wherein enforcing the downstream port containment comprises: a digital signal processor of a downstream port enforcing port containment on an I/O link responsive to an uncorrectable error signaled as ERR_FATAL by the I/O adapter and reporting the port containment to the root complex in a message signaled interrupt.

10. A computer program product, comprising: one or more computer-readable storage media; and program instructions stored on the one or more computer-readable storage media to perform computer operations, the computer operations including: at a root complex interposed between a plurality of server platforms and a plurality of I/O switches, processing circuitry receiving, via an I/O switch among the plurality of I/O switches, notification of downstream port containment of an I/O port to which an I/O adapter is coupled; in response to receipt of the notification, the processing circuitry notifying the plurality of server platforms of the downstream port containment to cause the plurality of server platforms to refrain from attempting communication of I/O traffic via the I/O adapter; during an containment interval, a controlling server platform among the plurality of server platforms checking an I/O communication link coupling the I/O adapter and the I/O switch and collecting metadata regarding adapter operation from the I/O adapter for root-cause analysis while the I/O adapter is being subject to downstream port containment; and the processing circuitry waiting a containment interval, and thereafter, releasing the containment to permit resetting of the I/O adapter, wherein the I/O adapter is a storage adapter; providing the notification to the plurality of server platforms comprises an MSI broadcast to all of the plurality of server platforms; and the containment interval terminates in response to a message from the controlling server platform.

11. The computer program product of claim 10, wherein the computer operations further comprise:

the controlling server platform resetting the I/O adapter after elapsing of the containment interval.

12. The computer program product of claim 10, wherein the computer operations further comprise:

a controlling server platform among the plurality of server platforms determining whether a port containment count for the I/O adapter satisfies a containment threshold; and based on determining that the port containment count satisfies the containment threshold, the controlling server platform fencing the I/O adapter from receiving further I/O traffic and marking for physical replacement a field-replaceable unit including the I/O adapter.

13. The computer program product of claim 10, wherein: receiving notification of downstream port containment includes receiving a message signaled interrupt.

14. The computer program product of claim 10, wherein: releasing containment includes the processing circuitry signaling release of containment to both the I/O adapter and the plurality of server platforms.

15. A data processing system, comprising: processing circuitry; and one or more computer-readable storage media communicatively coupled to the processing circuitry, wherein the one or more computer-readable storage media includes program instructions to perform operations including: at a root complex interposed between a plurality of server platforms and a plurality of I/O switches, processing circuitry receiving, via an I/O switch among the plurality of I/O switches, notification of downstream port containment of an I/O port to which an I/O adapter is coupled; in response to receipt of the notification, the processing circuitry notifying the plurality of server platforms of the downstream port containment to cause the plurality of server platforms to refrain from attempting communication of I/O traffic via the I/O adapter; during an containment interval, a controlling server platform among the plurality of server platforms checking an I/O communication link coupling the I/O adapter and the I/O switch and collecting metadata regarding adapter operation from the I/O adapter for root-cause analysis while the I/O adapter is being subject to downstream port containment; and the processing circuitry waiting a containment interval, and thereafter, releasing the containment to permit resetting of the I/O adapter, wherein the I/O adapter is a storage adapter; providing the notification to the plurality of server platforms comprises an MSI broadcast to all of the plurality of server platforms; and the containment interval terminates in response to a message from the controlling server platform.

16. The data processing system of claim 15, wherein the operations further comprise: the controlling server platform resetting the I/O adapter after elapsing of the containment interval.

17. The data processing system of claim 15, wherein the operations further comprise: a controlling server platform among the plurality of server platforms determining whether a port containment count for the I/O adapter satisfies a containment threshold; and based on determining that the port containment count satisfies the containment threshold, the controlling server platform fencing the I/O adapter from receiving further I/O traffic and marking for physical replacement a field-replaceable unit including the I/O adapter.

18. The data processing system of claim 15, wherein: receiving notification of downstream port containment includes receiving a message signaled interrupt.

19. The data processing system of claim 15, wherein: releasing containment includes the processing circuitry signaling release of containment to both the I/O adapter and the plurality of server platforms.

* * * * *